US008423778B2

(12) United States Patent
Mohanty

(10) Patent No.: US 8,423,778 B2
(45) Date of Patent: Apr. 16, 2013

(54) APPARATUS AND METHOD FOR TRANSMITTING SECURE AND/OR COPYRIGHTED DIGITAL VIDEO BROADCASTING DATA OVER INTERNET PROTOCOL NETWORK

(75) Inventor: Saraju P. Mohanty, Denton, TX (US)

(73) Assignee: University of North Texas, Denton, TX (US)

( * ) Notice: Subject to any disclaimer, the term of this patent is extended or adjusted under 35 U.S.C. 154(b) by 654 days.

(21) Appl. No.: 12/273,858

(22) Filed: Nov. 19, 2008

(65) Prior Publication Data

US 2009/0132825 A1   May 21, 2009

Related U.S. Application Data

(60) Provisional application No. 61/004,044, filed on Nov. 21, 2007.

(51) Int. Cl.
   *H04L 9/32*   (2006.01)
(52) U.S. Cl.
   USPC ........... 713/176; 713/324; 380/210; 380/279; 700/94; 704/235
(58) Field of Classification Search .................. 713/176, 713/324; 380/210, 279; 700/94; 704/235; 382/100; 705/51, 57
   See application file for complete search history.

(56) References Cited

U.S. PATENT DOCUMENTS

| | | | | |
|---|---|---|---|---|
| 6,944,296 B1* | 9/2005 | Liu et al. | ........................ | 380/201 |
| 7,269,273 B2* | 9/2007 | Murakami | .................... | 382/100 |
| 7,634,112 B1* | 12/2009 | Lefevere et al. | .............. | 382/112 |
| 2001/0012019 A1* | 8/2001 | Yamazaki et al. | ............ | 345/639 |
| 2002/0095577 A1* | 7/2002 | Nakamura et al. | ............ | 713/176 |
| 2003/0046240 A1* | 3/2003 | Stone et al. | ...................... | 705/51 |
| 2003/0147549 A1* | 8/2003 | Choi et al. | ..................... | 382/100 |
| 2003/0172274 A1* | 9/2003 | Hsia et al. | ...................... | 713/176 |
| 2003/0202679 A1* | 10/2003 | Rodriguez | .................... | 382/100 |
| 2005/0129270 A1* | 6/2005 | Prakash | ........................ | 382/100 |
| 2005/0144134 A1* | 6/2005 | Hirano | ............................ | 705/51 |
| 2005/0169496 A1* | 8/2005 | Perry | ............................ | 382/100 |
| 2005/0229107 A1* | 10/2005 | Hull et al. | ..................... | 715/764 |
| 2006/0209349 A1* | 9/2006 | Tabata | ........................ | 358/3.28 |
| 2007/0180135 A1* | 8/2007 | Kenrick et al. | ............... | 709/231 |
| 2007/0245386 A1* | 10/2007 | Morley et al. | ................... | 725/78 |

\* cited by examiner

*Primary Examiner* — Kambiz Zand
*Assistant Examiner* — Tongoc Tran
(74) *Attorney, Agent, or Firm* — Jackson Walker L.L.P.

(57) ABSTRACT

A content distribution method for video copyright authentication and security comprising the steps of invisibly watermarking digital video data input from a video data source to create watermarked data; encrypting the watermarked digital video data using an encryption key to create encrypted video data; sending the encrypted watermarked digital data and a decryption key to a distribution network; decrypting the encrypted watermarked digital data to generate video data and adding visible watermarking data to the video data to generate visibly encrypted watermarked data compressing the visibly encrypted watermarked data to create compressed data; sending said compressed data and to an end user receiver; decompressing the compressed data at the receiver to generate decompressed data; and displaying the decompressed data to an end user.

9 Claims, 8 Drawing Sheets

APPARATUS AND METHOD FOR TRANSMITTING SECURE AND/OR COPYRIGHTED DIGITAL VIDEO BROADCASTING DATA OVER INTERNET PROTOCOL NETWORK

This application claims priority to U.S. Provisional Patent Application Ser. No. 61/004,044, entitled "Apparatus and Method for Transmitting Secure and/or Copyrighted Digital Video Broadcasting Data Over Internet Protocol Network," filed on Nov. 21, 2007, the entire content of which is hereby incorporated by reference.

BACKGROUND

The present invention generally relates to secure transmission protocols and more particularly to methods and apparatus capable of securing digital video broadcast data over internet protocol (IP) networks.

Digital data can be transmitted from one node to another over the available high bandwidth Internet Protocol (IP) network, including complex digital transmissions such as voice over IP (VoIP) or video over IP, for example, Internet Protocol Television (IP-TV). The major advantage of integrating IP networks and complex digital data technologies in a common framework is that both traditional Internet data and video and audio data are accessible in a single box. Accordingly, transmission of digital video and audio signals through the IP network will provide several advantages, such as better quality of service (QoS), lower consumer costs through the integration of multiple services with one provider, low-power consumption, and better internet access controls for parents. Also, more entertainment and educational applications, such as commercial TV, video on demand, time-shifted TV, video phones, game portals, personal digital library, and the like, can be more readily supported by IP-TV than with traditional television broadcasting. Several issues must be addressed for IP-TV to become commonly used as the primary transmission service for consumer television. These challenges include scalability, high-quality transmissions, support of a broad service portfolio, cost-effective service deployment, security, and copyright protection.

SUMMARY

Digital audiovisual data, when being transmitted and received by the intended party through the Internet, is susceptible to security attacks and data manipulation. The primary reason for this problem is the ease of editing digital multimedia using a multitude of commercially available editing software. To safeguard digital data for transmission, the following must be implemented: (1) determination of the data owner, (2) determination of the data origin, (3) determination of the data creator, (4) tracking usage by consumers, (5) determination of any copyright ownership rights, (6) ensuring consumers and providers are authorized to access the transmission stream, (7) preventing illegal replication of data, (8) facilitating content authentication of data, (9) detection of data tampering, and (10) providing tamper proof data.

The present invention provides the above safeguards to digital audiovisual data when transmitted over an IP network through digital rights management (DRM) techniques. The audiovisual data acquisition and transmission system implements a two-way communication method and can use broadband technology over a local loop or other suitable media. In one exemplary embodiment, the network topology is of a "star" form, or other suitable forms can also or alternatively be used. The hub of the star, called a head end, uses a digital subscriber line access multiplexer (DSLAM). The service can use a set-top box with storage mechanisms for providing the full scope of services. The methods and apparatus disclosed herein can process a stream of digital data, such as those generated in accordance with the MPEG or H264 standards or other suitable standards or processes that provide high quality video with low-bandwidth, low-memory requirements, and then broadcast it.

BRIEF DESCRIPTION OF THE DRAWINGS

A more complete understanding of the present disclosure and advantages thereof may be acquired by referring to the following description taken in conjunction with the accompanying figures, wherein.

Figure 1:
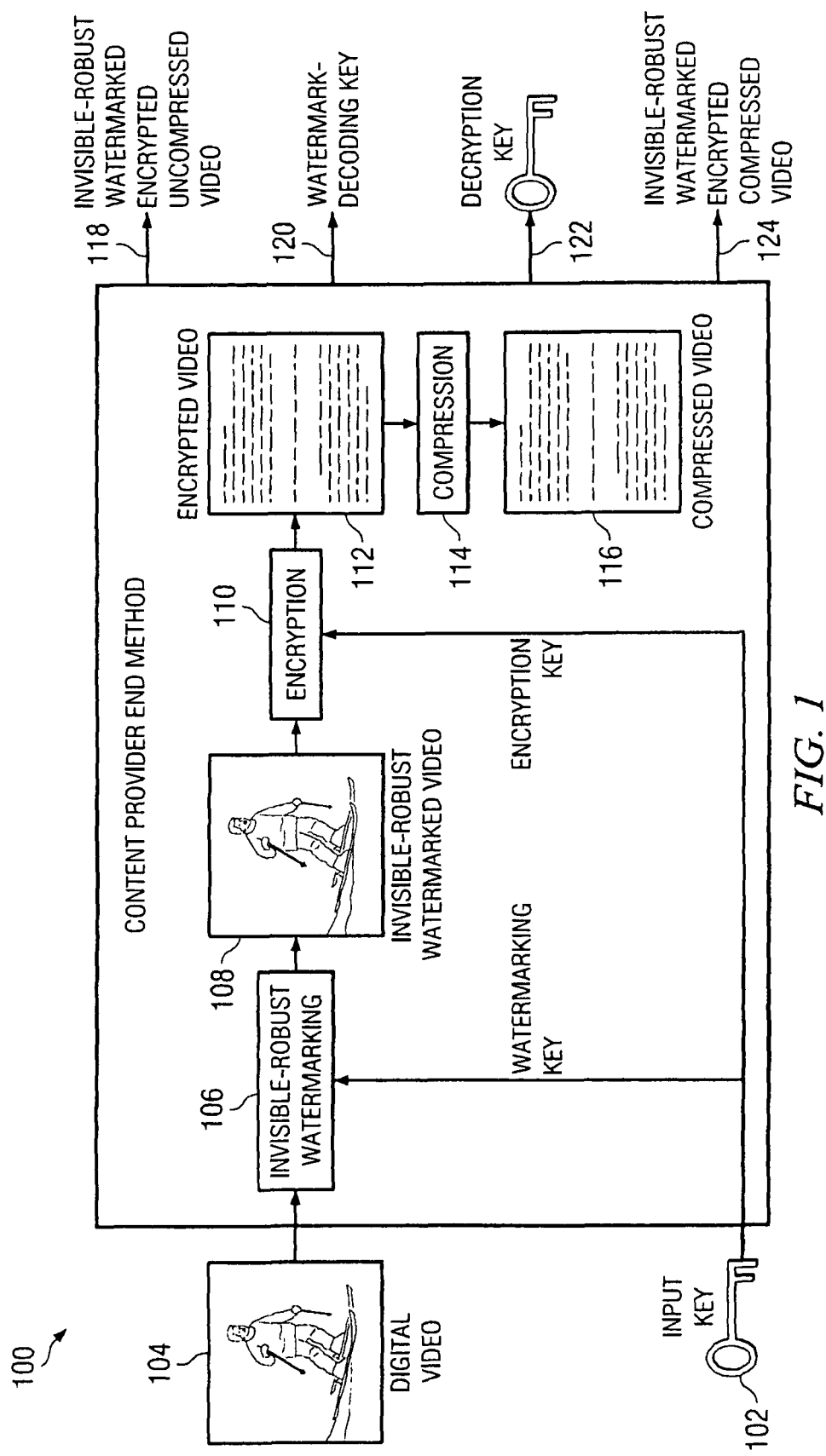
FIG. 1 is a block diagram of a sequence of operations for a content-provider end of an exemplary embodiment of the invention.

While exemplary embodiments of the present invention described herein are susceptible to various modifications and alternative forms, specific exemplary embodiments thereof have been shown by way of example in the drawings and are herein described in detail. It should be understood, however, that the description herein of specific exemplary embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

In one exemplary embodiment of the present invention, a transmission system method and apparatus can be comprised of a content provider end transmission method and apparatus located at the content provider, a content distributor end receiver and transmission method and apparatus located at the content distributor, and a client end receiver method and apparatus located at a client or consumer home.

An exemplary content provider transmission end method and apparatus will now be discussed with reference to FIG. 1 and FIG. 5. Generally, the content provider creates the audiovisual content and is the source end for the digital broadcast, which is sent to the content distributor and then to clients or consumers. Since the content provider is responsible for delivering digital content to multiple content distributors, and then to even more consumers, content quality must remain high in the transmission between the content provider and the content distributor. Accordingly, the method according to the exemplary embodiment of the invention transmits uncompressed raw digital audiovisual content from a content provider to a content distributor with copyright protection and security mechanism integrated in the audiovisual data stream. Although uncompressed data can be utilized, if the number of distributors is too high or the transmission bandwidth is not high enough for the transmission of uncompressed audiovisual data, then compressed audiovisual data transmission may be utilized As shown in FIG. 1 digital audiovisual data 104, such as real-time data from a digital motion camera (e.g. sports channel doing live broadcasting) or from a server storing digital audiovisual content, is received as an input to transmission system 100 of the content provider. Two keys 102 are also input, an input key for watermarking and an input key for encryption. The digital audiovisual data 104 is first watermarked using invisible-robust watermarking system 106 employing the watermarking key and watermarked audiovisual data 108 is then encrypted by encryption system 110 using the encryption key. The invisible-robust watermarking system hides some ownership information permanently in a host media in the form of a pseudorandom number, logo image, signature, or other suitable form, as a proof of ownership.

The watermarked and encrypted audiovisual data 112 is then compressed by compression system 114, such as by using MPEG-4 or H264 standard compression processing or other suitable processes, and the compressed audiovisual data 116 is output by output system 124. Encrypted audiovisual data 112 may be directly output as invisible watermarked encrypted uncompressed audiovisual data 118 if the bandwidth between content-provider and content-distributor is high enough to carry the transmission. The content provider transmission method also outputs two keys, a watermark decoding key 120 for watermarking decoding/extraction and authentication, and a decryption key 122 so that the content distributor can process the watermarked and encrypted audiovisual data. The watermarking key can be output to server memory.

Figure 5:
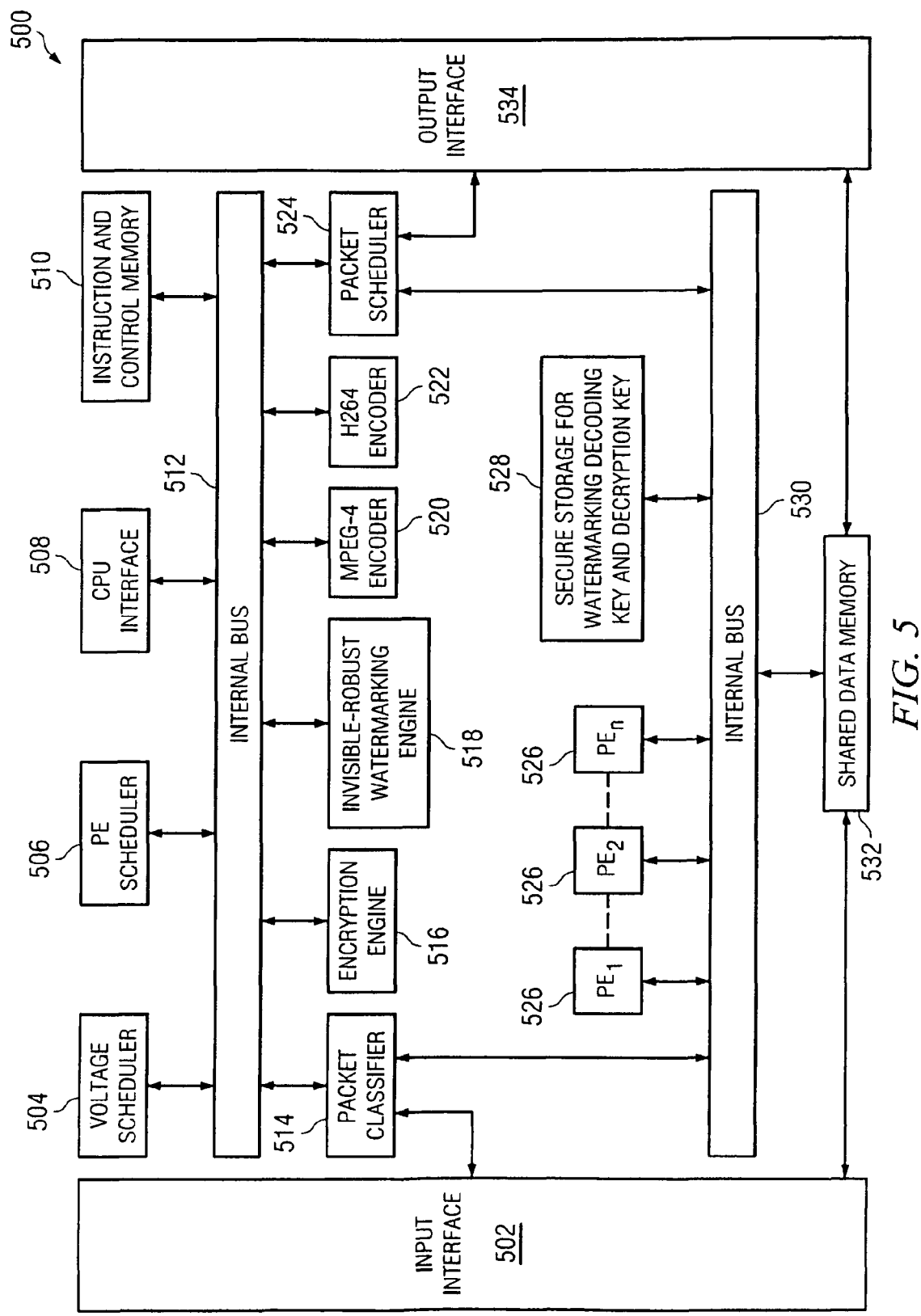
FIG. 5 is a block diagram of an exemplary apparatus capable of performing the content provider end operations described in FIG. 1.

FIG. 5 is a diagram of an apparatus 500 for content end provider processing in accordance with an exemplary embodiment of the present invention. Apparatus 500 can be implemented as a system-on-a-chip (SoC) architecture or in other suitable manners. Apparatus 500 includes processing elements 526 ($PE_1$ through $PE_n$), each with dedicated operational capabilities and which can be connected through internal bus 512 or 530 or in other suitable manners. Processing elements 526 can be implemented as a reduced instruction set computer (RISC) core, a co-processor, an application specific integrated circuit (ASIC), an FPGA, or in other suitable manners. Processing elements 526 can operate in parallel, can have operations scheduled based on a particular operation depending on the application requirements, or can operate in other suitable manners.

As is shown in FIG. 5, apparatus 500 includes an input interface 502, voltage scheduler 504, PE scheduler 506, CPU interface 508, instruction and control memory 510, internal bus 512, packet classifier 514, encryption engine 516, invisible-robust watermarking engine 518, MPEG-4 encoder 520, H264 encoder 522, packet scheduler 524, processing elements (PE) 526, secure storage 528, internal bus 530, shared data memory 532, and output interface 534. Each of these elements is discussed in detail below.

Input interface 502 receives audiovisual data packets from a suitable data source or other suitable systems. In one exemplary embodiment, input interface 502 receives broadcast television data, audiovisual data from a network for transmission to affiliates and receivers, or other suitable audiovisual data.

Voltage scheduler 504 receives power and performance specification data and dynamically assigns the operating voltage for each processing element 526, such as in response to traffic load data or other application requirement data, so as to conform with the power and performance specification data, so as to reduce switching or dynamic power consumption.

PE scheduler 506 receives application data and determines which processing elements 526 should be turned off, based on the application data, so as to reduce standby power consumption from processing elements 526 that are not required by a specific application.

CPU interface 508 allows apparatus 500 to communicate with a CPU of a personal computer or other suitable devices.

Instruction and control memory 510 stores instructions, algorithms or other processes that are used to control apparatus 500 or its associated systems.

Output interface 534 transmits data to a content distributor or other suitable parties. In one exemplary embodiment, output interface 534 transmits packets of audiovisual content data, watermarked audiovisual content data, or other suitable data.

Internal busses 512 and 530 provide a communication channel between encryption engine 516, invisible robust watermarking engine 518, processing elements 526, and other suitable components of apparatus 500.

Packet classifier 514 reads the header of an incoming data packet, determines whether the data packet is associated with a stream of audiovisual data, determines a destination using routing lookup, routes the data packet to encryption engine 516, invisible robust watermarking engine 518, processing elements 526, and other suitable components of apparatus 500 for further processing, and performs other suitable functions. Packet classifier 514 distinguishes between a regular IP packet and an audiovisual data packet, and routes audiovisual data packets to the appropriate engine, processing element 526 or other suitable system for processing.

Encryption engine 516 performs real time audiovisual data encryption, such as where encryption is performed when the audiovisual data is transmitted from the content provider to the content distributor. While encryption can be performed on certain classes of audiovisual data prior to transmission from the content provider, real-time encryption is required for unencrypted audiovisual data content, such as for broadcast live news, sports, or other content. Encryption engine 516 processes such content at speeds that allow the content provider to deliver content to content distributors without delay.

Invisible robust watermarking engine 518 performs invisible robust watermarking of audiovisual data, such as by inserting invisible and robust watermarks in the audiovisual data before the audiovisual data is sent to the content distributor. Invisible robust watermarking engine 518 can also extract and authenticate invisible robust watermarks whenever necessary to authenticate copyright data, ownership data, and other suitable data. The invisible insertion capability of invisible robust watermarking engine 518 supports both real time and non-real time decoding, extraction, authentication, and transmission to the content distributor, as well as other suitable processing.

MPEG-4 encoder 520 performs MPEG-4 encoding of the audiovisual data for compression. In one exemplary embodiment, MPEG-4 encoder 520 supports real time encoding, non-real time encoding, or other suitable processes.

H264 encoder 522 performs H264 encoding of the audiovisual data for compression. In one exemplary embodiment, H264 encoder 522 supports real time encoding, non-real time encoding, or other suitable processes.

Packet scheduler 524 controls one or more separate traffic stream, determines audiovisual data stream, and performs other suitable functions. Outgoing audiovisual data packets can be dynamically buffered by packet scheduler 524 pending transmission, can be stored for transmission where offline processing is performed, or other suitable functions can be performed.

Processing elements 526 ($PE_1$ through $PE_n$) perform standard networking operations, such as packet forwarding, firewall management, traffic management, and the like. In one exemplary embodiment, processing elements 526 can operate sequentially, in parallel, or in other suitable manners based on power specifications, performance specifications or other suitable criteria.

Secure storage 528 provides a secure storage or memory for the watermarking decoding key, the decryption key and other suitable data. In one exemplary embodiment, secure storage 528 can utilize suitable security and access control processes to prevent unauthorized access to the watermarking decoding key, the decryption key and other suitable data.

Shared data memory 532 stores audiovisual data packets that are temporarily needed for processing by systems of apparatus 500. Shared data memory 532 stores or buffers the data and avoids data conflicts between the systems of apparatus 500.

Figure 2:
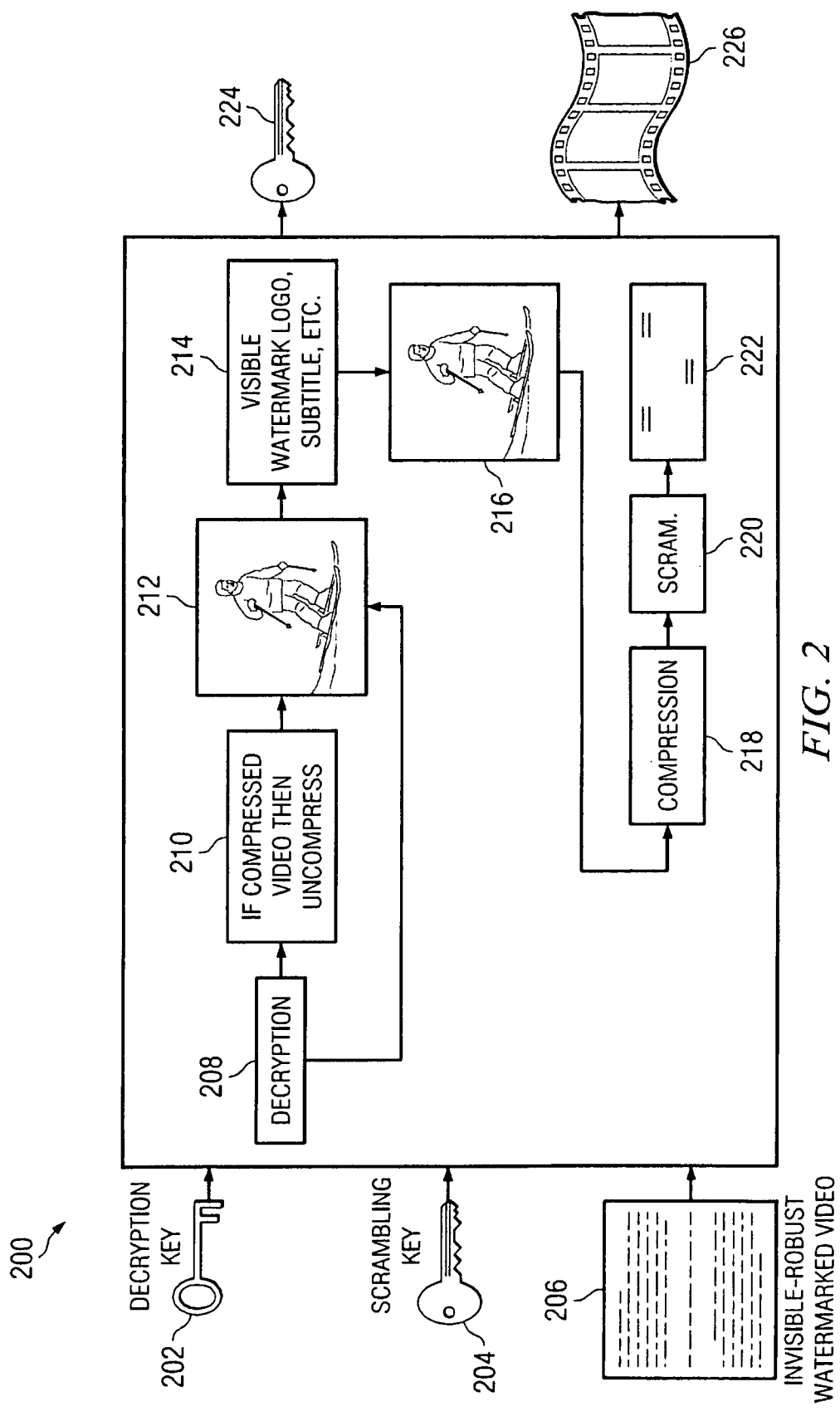
FIG. 2 is a block diagram of a sequence of operations for a content distributor end of an exemplary embodiment of the invention described in FIG. 1.
Figure 4:
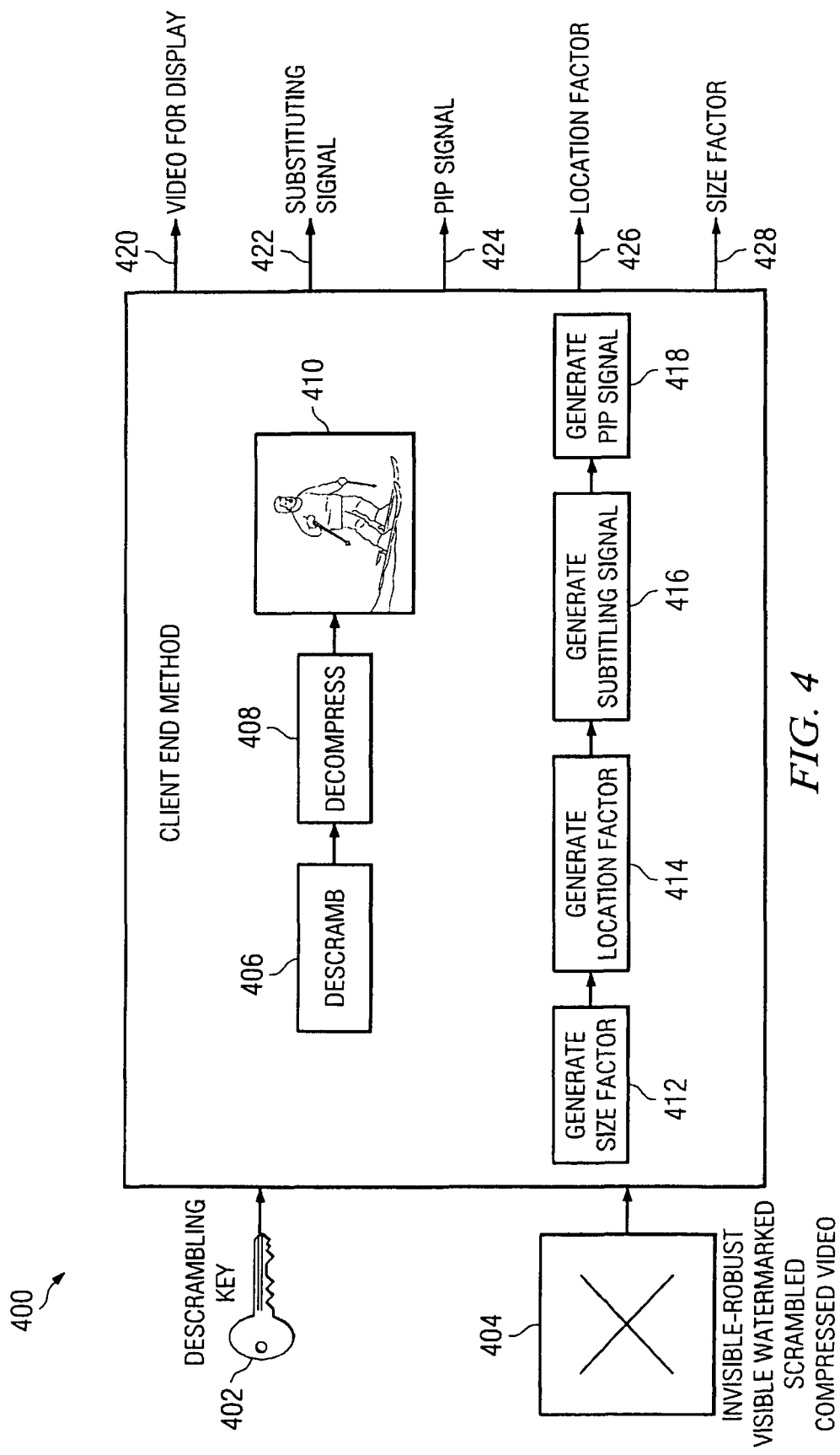
FIG. 4 is a block diagram of a sequence of operations for a client end of an exemplary embodiment of the invention described in FIG. 1.
Figure 6:
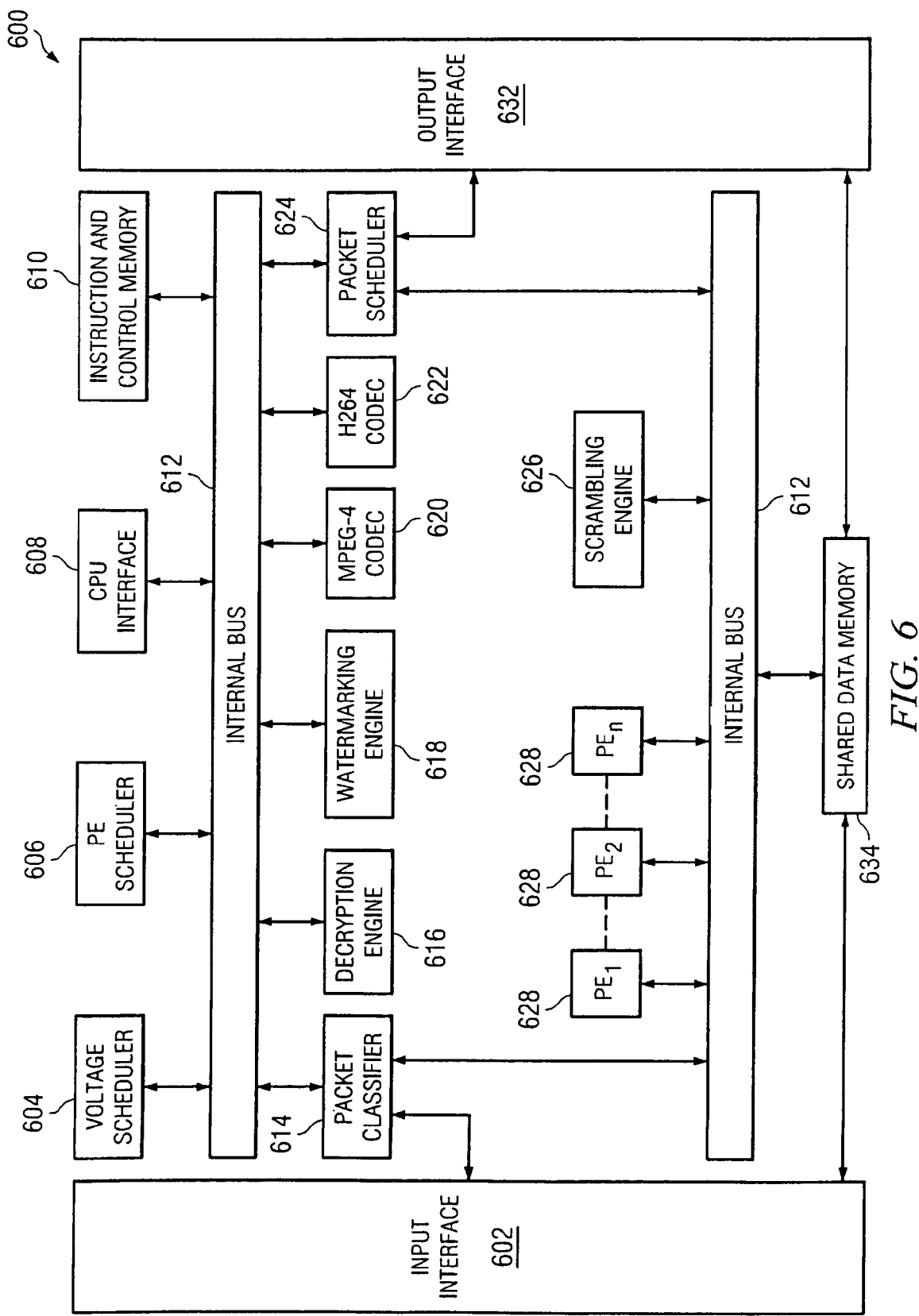
FIG. 6 is a block diagram of an exemplary apparatus capable of performing the content distributor end operations described in FIG. 2.

An exemplary content distributor end receiver and transmission apparatus is described in reference to FIG. 2, FIG. 4 and FIG. 6.

As shown in FIG. 2, the content distributor receiver/transmitter 200 receives three different inputs from the content provider transmitter: a decryption key 202, scrambling key 204 and invisible robust watermarked encrypted audiovisual data 206, which may or may not be compressed. The audiovisual data is decrypted by decryption system 208, which generates the invisible robust watermarked audiovisual data 212. If the audiovisual data is in compressed form it is decompressed by decompression system 210. The invisible robust watermarked audiovisual data 212 is then processed by watermarking system 214, which inserts visible watermarking, such as a broadcasters' logo, subtitles, or other suitable watermarking. The broadcasters' logo can be used to provide the copyright and ownership information in the broadcasting audiovisual data 216. The audiovisual data is then compressed by compressor 218, such as by using MPEG-4 compliant compression, H264 compliant compression or other suitable compression. Scrambler 220 performs packet scrambling or other suitable data scrambling, and transmitter 222 transmits the visible watermarked scrambled compressed audiovisual data, such as by using IP transmission protocols or other suitable protocols, to various clients. A descrambling key 224 is also provided, which is needed at the client-end for viewing this audiovisual data. The final audiovisual data 226 is thus created.

Figure 3:
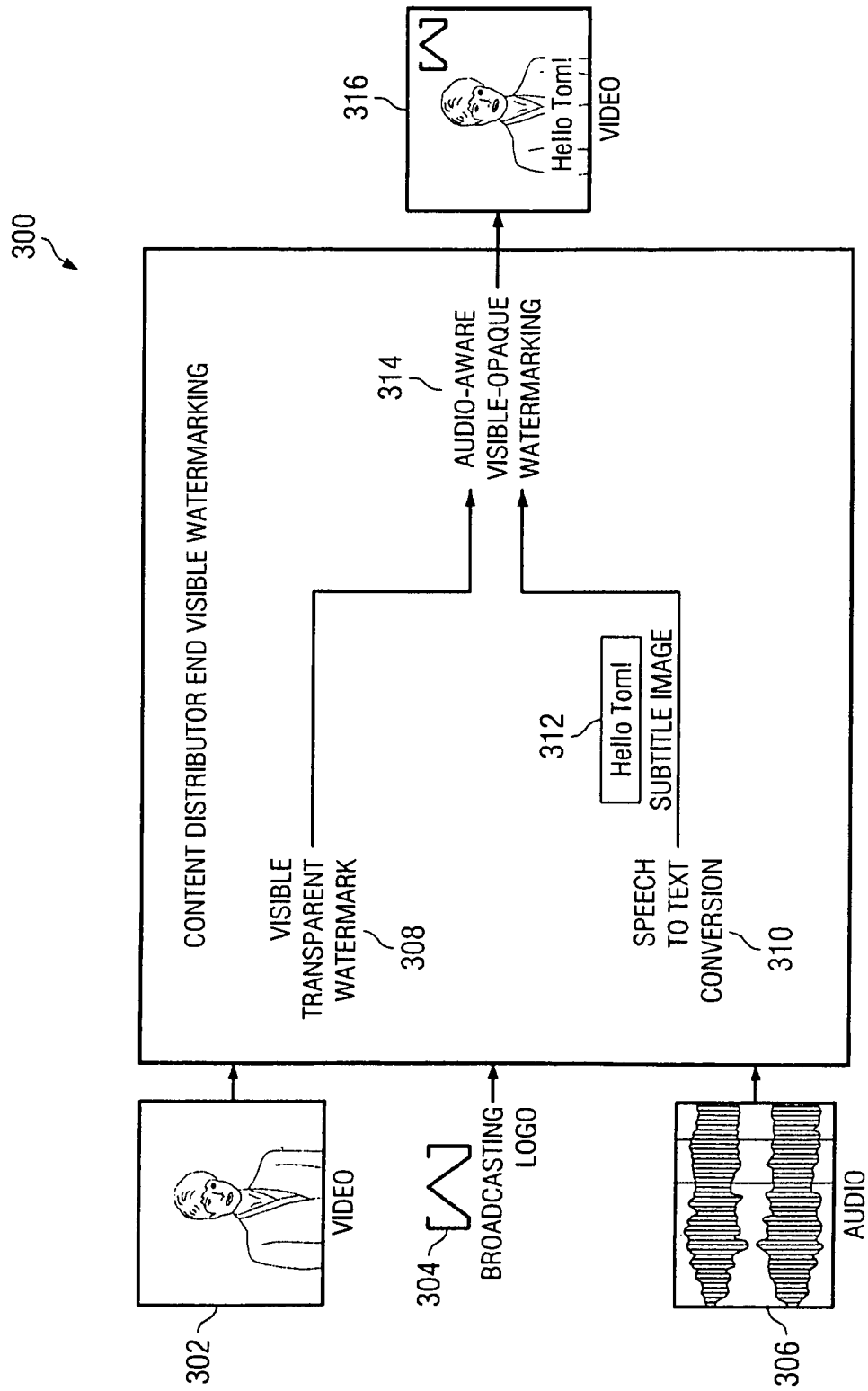
FIG. 3 is a block diagram of a sequence of operations for an exemplary watermarking operation described in FIG. 2.

FIG. 3 is a diagram of a system 300 for visible watermarking in accordance with an exemplary embodiment of the present invention. Generally, IP-TV and audiovisual data broadcasting involve transmitting signals broadcasted by different stations that may possibly have different broadcasting rights. Thus, insertion of different broadcaster's logo on different digital audiovisual data streams is required before content can be distributed to consumers. Also, a broadcaster may, for real-time broadcasting, such as live sports broadcasts, insert subtitles into the data transmission. Accordingly, visible watermarking technology is used for two different purposes: to insert content broadcaster's logo to explicitly express the intellectual property right and to insert subtitles of the audiovisual data.

In general, a video signal 302, a broadcasting logo 304, and an audio signal 306 are received by system 300. The video signal 302 is then processed with the appropriate logo by visible transparent watermark system 308, and if the video signal contains an instruction that the video content needs subtitles, the audio signal 306 is converted to text by speech to text conversion system 310. Subtitled image system 312 generates subtitled video data, and audio aware visible opaque watermarking system 314 generates output signal 316 for transmission.

There are several different user specified parameters that can be supported by visible transparent watermark system 308, such as the location of the logo, the size of the logo, the intensity of the logo, or other suitable parameters. Visible transparent watermark system 308 can insert data, such as a broadcaster's logo, in the bottom of the video frame, at a desired location, or in other suitable locations. While the location of the logo needs to be selected in such a way that the audiovisual quality does not get degraded or distract the viewers' attention, the location of the logo can be changed as required, such as from the bottom-left to the bottom-right, top-left, or other suitable locations. This parameter is called the "location." In existing TV broadcasting the logo is typically overlaid on the frame that makes the portion of the frame opaque. However, the visible watermarking process of system 300 inserts the logo in such a way that the audiovisual clip is completely visible and transparent even beneath the watermark logo. The size of the watermark logo is also something that can be chosen by a broadcaster. While bigger size can be distracting to the viewers, it can occupy larger frame area and discourage tampering by digital thieves. Thus, the user will have options to specify size of the broadcasters' logo as percentage size of the host video frame. This parameter is called the "size".

Speech to text conversion system 310 allows a user to also decide text size, vibrancy and location of subtitles. If the subtitle is transparent over the frame, it may be difficult for a viewer to read the subtitles, depending on the format of the audiovisual content. In one exemplary embodiment, the subtitle is inserted as a visible-opaque watermark. The subtitles can also be automatically inserted upon request using a "subtitling signal."

FIG. 6 is a diagram of a system 600 for content distributor receiver/transmission processing in accordance with an exemplary embodiment of the present invention. System 600 can be implemented as a system on chip (SoC) architecture consisting of several processing elements, each with dedicated operational capabilities and all of them connected through an internal bus, or in other suitable manners. The processing elements can be implemented as a RISC core, a co-processor, an ASIC, an FPGA or in other suitable manners. In order to perform a particular operation depending on the application requirements, a set of processing elements can operate in parallel, can be scheduled, or can operate in other suitable manners.

System 600 includes input interface 602, voltage scheduler 604, PE scheduler 606, CPU interface 608, instruction and control memory 610, internal buses 612, packet classifier 614, decryption engine 616, watermarking engine 618, MPEG-4 Codec 620, H264 Codec 622, packet scheduler 624, processing elements 628, scrambling engine 626, shared data memory 634, and output interface 632, each of which is described in greater detail below.

Input interface 602 receives data packets from the content provider. In one exemplary embodiment, the data packets can include video data, audio data, watermark data, or other suitable data.

Voltage scheduler 604 receives power specifications, performance specifications and other suitable data and dynamically assigns the operating voltage of each processing element 628 so as to reduce switching or dynamic power consumption of system 600.

PE scheduler 606 activates and deactivates each processing element 628, depending on the application to be executed. The inactive processing elements 628 are shut off using a switching mechanism to reduce standby power consumption.

CPU interface 608 allows system 600 to communicate with a CPU, such as a CPU of a personal computer, a server, or other suitable systems.

Instruction and control memory 610 stores instructions, algorithms or other data for the control of system 600.

Output interface 632 transmits data packets to receivers, such as over an IP network or other suitable communications media.

Internal buses 612 provide communications channels between the component systems of system 600.

Packet classifier 614 distinguishes between a regular IP packet and audiovisual data packet. For an audiovisual data packet, packet classifier 614 reads the header of an incoming packet, determines the stream to which the packet belongs, decides the outgoing interface using routing lookup, and routes the packet to decryption engine 616, watermarking engine 618, a processing element 628, or other suitable systems for further processing. In one exemplary embodiment, packet classifier 614 can be implemented with parallel high-performance architectures to facilitate high data packet processing rates.

Decryption engine 616 performs real time and non-real time audiovisual data decryption when content distributor receives encrypted audiovisual data from content provider. Non-real time decryption is acceptable for stored content, such as for movies or other programmatic content that are received from the content provider, whereas real-time decryption is performed for broadcasting of live events such as news, sports programs or other such content.

Watermarking engine 618 performs watermarking of audiovisual content data for real-time subtitling and broadcaster's logo insertion as discussed above. Watermarking engine 618 can perform real-time processing, and can handle multiple client-end users and multiple broadcasters. Watermarking engine 618 performs both visible-transparent watermarking and visible-opaque watermarking in real-time along with speech-to-text conversion. Watermarking engine 618 also performs speech to text conversion for performing subtitling in real-time.

MPEG-4 codec 620 performs both high speed decoding and high speed encoding of the audiovisual content data in accordance with the MPEG-4 standard, and also performs decompression and compression of the audiovisual content data when the content distributor receives audiovisual content data from a content provider and then broadcasts the audiovisual content data to end users.

H264 codec 622 performs H264 encoding and decoding of the audiovisual content data in accordance with the H264 standard, and also performs decompression and compression.

Packet scheduler 624 controls processing of different audiovisual content data streams and determines audiovisual content data stream quality. Outgoing data packets are dynamically buffered by packet scheduler 624 until they are ready to be sent to an outgoing link. Packet scheduler 624 can be implemented with parallel high-performance architectures in order to support multiple parallel audiovisual content data streams.

Processing elements 628 perform standard networking operations.

Scrambling engine 626 performs high speed scrambling of the audiovisual content data before the audiovisual content data is sent to receivers through the IP network or other suitable media, such as to improve data security.

Shared data memory 634 stores audiovisual content data packets temporarily as they are needed for processing by the component systems of system 600. The size of shared data memory 634 is typically larger than shared data memory 532 of apparatus 500 because system 600 will generally be used to provide more data to receivers.

The client end receiver apparatus and method will now be discussed with reference to FIG. 4 and FIG. 7. In general, since at the client end a single client receives audiovisual content data from several content distributors and providers, the client end method and apparatus enables the consumer to view the audiovisual content data content received from the content distributor that is invisible robust and visible watermarked scrambled compressed audiovisual data.

FIG. 4 is a diagram of a system 400 for a client-end receiver that receives invisible robust and visible watermarked scrambled compressed audiovisual data 404 and descrambling key 402. The invisible robust and visible watermarked scrambled compressed audiovisual data 404 is first descrambled using the descrambling key 402 by descrambler 406. The audiovisual content data is decompressed by decompressor 408 into a signal 410 having a format that can be displayed on a television monitor, computer monitor or other suitable monitors or appliances. Size factor generator 412 selects the size of broadcaster's logo, and location factor system 414 determines the location for the broadcaster's logo. Subtitle generator 416 generates subtitles from the audiovisual content data. Picture-in-picture (PIP) generator 418 allows another channel from the same or different content distributor to be generated as a smaller picture within the larger audiovisual content data screen. The audiovisual content data 420, subtitling signal 422, PIP signal 424, location factor 426 and size factor 428 are then all output.

Figure 7:
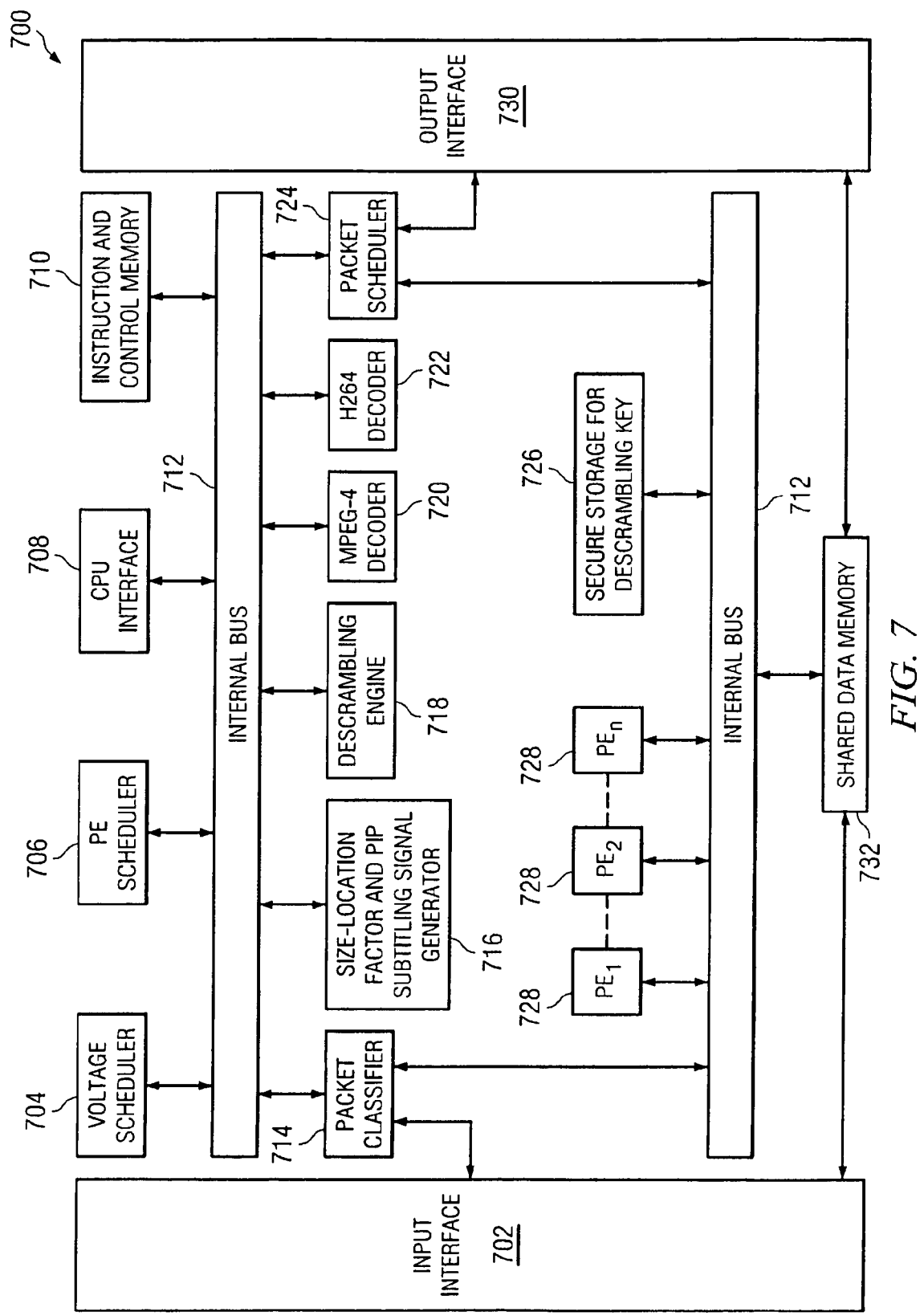
FIG. 7 is a block diagram of an exemplary apparatus capable of performing the client end operations described in FIG. 4.

FIG. 7 is a diagram of a system 700 for a client-end receiver in accordance with an exemplary embodiment of the present invention. Generally, system 700 can be part of the set-top boxes at the TV terminals or similar audiovisual data display hardware at the individual users end, and can be implemented as a system-on-a-chip (SoC) architecture or in other suitable manners.

System 700 includes input interface 702, voltage scheduler 704, PE scheduler 706, CPU interface 708, instruction and control memory 710, internal buses 712, packet classifier 714, factor generator 716, descrambling engine 718, MPEG-4 decoder 720, H264 decoder 722, packet scheduler 724, processing elements 728, secure storage 726, shared data memory 732, and output interface 730.

Input interface 702 is a port through which the client-end receiver receives packets from the content distributor.

Voltage scheduler 704 dynamically assigns the operating voltage of each processing element 728 depending on the traffic load and application requirements so that power and performance specifications for transmission are met, thereby reducing switching or dynamic power consumption of system 700.

PE scheduler 706 activates and deactivates each processing element 728, depending on the application to be executed. The inactive processing elements 728 are shut off using a switching mechanism to reduce standby power consumption.

CPU interface 708 is a port through which system 700 can communicate with a CPU of a personal computer, server, or other suitable systems.

Instruction and control memory 710 is used to store algorithms, controlling instructions and other programming for system 700.

Output interface 730 is a port through which a suitably formatted signal is provided to a television, monitor or other suitable system.

Internal buses 712 facilitate communications between the components of system 700.

Packet classifier 714 reads the header of an incoming packet, determines the stream to which the packet belongs and routes the packet to the component system of system 700. Packet classifier 714 distinguishes between a regular IP packet and an audiovisual content data packet.

Factor generator 716 generates size factor, location factor, and subtitle signal for the visible watermarking parameter generation, which are used to perform visible watermarking of logos and subtitles. Factor generator 716 also generates a picture-in-picture signal for requesting another channel from the same or different content distributor, and controls the formatting and placement of related audiovisual content data.

Descrambling engine 718 performs audiovisual content data descrambling after it is received through the IP network or other suitable communications media.

MPEG-4 decoder 720 decodes audiovisual content data that is encoded in a format that is compatible with the MPEG-4 standard format. MPEG-4 decoder 720 also performs decompression of the audiovisual data stream when the client receives compressed audiovisual content data from a content distributor.

H264 decoder 722 decodes audiovisual content data that is encoded in a format that is compatible with the H264 standard format. H264 decoder 722 also performs decompression of the audiovisual data stream when the client receives compressed audiovisual content data from a content distributor.

Packet scheduler 724 controls different traffic streams and determines audiovisual data stream quality. The outgoing audiovisual data packets are dynamically buffered by packet scheduler 724 until they are ready to be transmitted to a device.

Processing elements 728 perform standard networking operations, and can each be implemented as a RISC core, a co-processor, an ASIC or an FPGA. In order to perform a particular operation depending on the application requirements, processing elements 728 can be operated in parallel, can be scheduled in series, or can operate in other suitable manners.

Secure storage 726 stores the descrambling key.

Shared data memory 732 stores audiovisual content data packet temporarily as they are needed for processing by the component systems of system 700. The data memory is used to store or buffer the data, and an appropriate mechanism is needed to avoid data conflict among the PEs.

Figure 8:
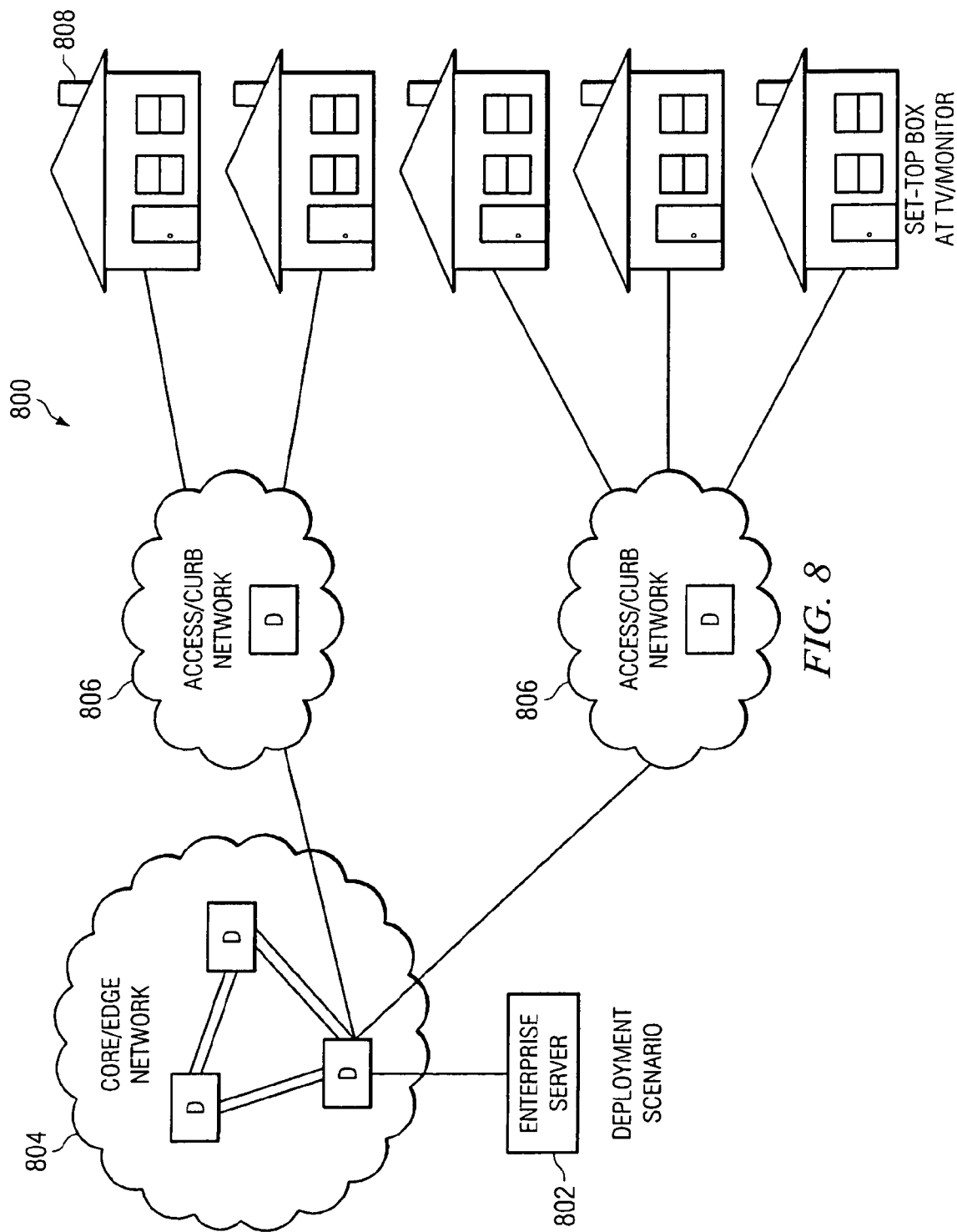
FIG. 8 is a deployment diagram of the apparatus and method according to an exemplary embodiment of the invention.

FIG. 8 is a diagram of a system 800 for providing digital rights management in accordance with an exemplary embodiment of the present invention. Enterprise server 802 can be used to provide audiovisual content for a particular channel or vendor for certain number of channels, and transmits the compressed or uncompressed audiovisual data (D) into the IP network or other suitable networks via a content provider transmission apparatus, which is maintained at core/edge network 804. The bandwidth requirements are in gigabits because it processes data from several channels for each enterprise server and may process several enterprise servers at the same time. Therefore, the buffer and the queue size requirements are very high. The audiovisual content data packets received are then processed and broadcast to the users through the IP network 806 or other suitable media. Set-top boxes 808 each contain a user end apparatus. Even when a single user requests audiovisual data (video on demand), it is also broadcast through the network by the distributor end apparatus. Once the packets reach the user, the set-top box splits Internet data and digital TV into two different streams so that the user can view them separately.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A content distribution method for audiovisual content data comprising:
    invisibly watermarking digital audiovisual content data input from an audiovisual content data source to create invisibly watermarked data;
    encrypting the invisibly watermarked data using an encryption key to create encrypted data;
    sending the encrypted data and a decryption key to a distribution network;
    decrypting the encrypted data to generate the invisibly watermarked data;
    adding visible watermarking data to the invisibly watermarked data to generate visibly and invisibly watermarked data, wherein the visible watermarking data includes subtitles and logo data, and wherein adding the visible watermarking data to the invisibly watermarked data to generate the visibly and invisibly watermarked data includes:
        detecting an instruction to add subtitles and logo data,
        performing speech to text conversion of an audio portion of the digital audiovisual content data and outputting subtitle data,
        adjusting the subtitle data to have a user selected text size, transparency, and location;
        adjusting the logo data to have a user selected size, transparency, and location; and
        adding the subtitle data and logo data as visible watermarking data to the invisibly watermarked data in real time to generate the visibly and invisibly watermarked data;
    compressing the visibly and invisibly watermarked data to create compressed data;
    scrambling the compressed data to create compressed scrambled data; and
    sending the compressed scrambled data to a receiver.

2. The content distribution method of claim 1 further comprising the step of compressing the encrypted data prior to sending the encrypted data to the distribution network.

3. A content distribution method comprising:
invisibly watermarking digital audiovisual content data input to create invisibly watermarked data;
encrypting the watermarked data using an encryption key to create encrypted data;
sending the encrypted data and a decryption key to a distribution network;
decrypting the encrypted data to generate the invisibly watermarked data;
adding visible watermarking data to the invisibly watermarked data to generate visibly and invisibly watermarked data, wherein the visible watermarking data includes subtitles and logo data, and wherein adding the visible watermarking data to the invisibly watermarked data to generate the visibly and invisibly watermarked data includes:
  detecting an instruction to add subtitles and logo data,
  performing speech to text conversion of an audio portion of the digital audiovisual content data and outputting subtitle data,
  adjusting the subtitle data to have a user selected text size, transparency, and location;
  adjusting the logo data to have a user selected size, transparency, and location; and
  adding the subtitle data and logo data as visible watermarking data to the invisibly watermarked data in real time to generate the visibly and invisibly watermarked data;
compressing the visibly and invisibly watermarked data to create compressed data;
scrambling the compressed data to create compressed scrambled data;
sending the compressed scrambled data to a receiver;
decompressing the compressed scrambled data at the receiver to generate the visibly and invisibly watermarked data; and
displaying the visibly and invisibly watermarked data.

4. The content distribution method of claim 3 further comprising the step of compressing the encrypted data prior to sending the encrypted data and the encryption key to the distribution network.

5. A content generation system comprising:
an input interface receiving audiovisual content data;
a storage storing an encryption key and an invisible watermarking key;
an invisible watermarking system receiving the audiovisual content data and the invisible watermarking key and generating invisibly watermarked audiovisual content data;
an encryption engine receiving the invisibly watermarked audiovisual content data and the encryption key and encrypting the invisibly watermarked audiovisual content data;
a plurality of processing elements for performing processing of the audiovisual content data, wherein the processing elements have dedicated operational capabilities and are interconnected;
a processing engine scheduler determining a number of processing elements that can be turned off based on processing requirements and generating a processing element control signal;
a voltage scheduler receiving the processing element control signal and dynamically adjusting a voltage for one or more processing elements based on the processing element control signal; and
an output interface transmitting the encrypted and invisibly watermarked audiovisual content data to a distribution system.

6. The content generation system of claim 5 further comprising a packet classifier receiving the audiovisual content data and IP packet data and routing the audiovisual content data the IP packet data.

7. A content distribution system comprising:
an input interface receiving encrypted and invisibly watermarked digital audiovisual content data and a decryption key;
a decryption engine receiving the encrypted and invisibly watermarked digital audiovisual content data and the decryption key and decrypting the invisibly watermarked digital audiovisual content data;
a watermarking engine receiving watermark data and the invisibly watermarked digital audiovisual content data, wherein the watermark data includes audio data and logo data, wherein the watermarking engine receives audio data and performs speech to text conversion of the audio data to produce subtitle data, and generating visibly and invisibly watermarked digital audiovisual content data in real time, wherein the visibly and invisibly watermarked audiovisual content data includes subtitle data and logo data;
an encryption engine receiving the visibly and invisibly watermarked digital audiovisual content data and the encryption key and encrypting the visibly and invisibly watermarked digital audiovisual content data;
a scrambler scrambling the encrypted visibly and invisibly watermarked digital audiovisual content data; and
an output interface transmitting the encrypted visibly and invisibly watermarked digital audiovisual content data to a receiver.

8. The content distribution system of claim 7 further comprising a compressor compressing the encrypted visibly and invisibly watermarked audiovisual content data.

9. A content receiver system comprising:
an input interface receiving encrypted visibly and invisibly watermarked audiovisual content data and a decryption key;
a decryption engine receiving the encrypted visibly and invisibly watermarked audiovisual content data and the decryption key and decrypting the visibly and invisibly watermarked audiovisual content data; and
a factor system receiving watermark data, location data, size data, and the visibly and invisibly watermarked audiovisual content data and generating visibly watermarked audiovisual content data in real time, wherein the visibly watermarked audiovisual content data includes a visual watermark including subtitle data and logo data independently located based on the location data and independently sized based on the size data.

* * * * *